United States Patent [19]

Neal, Jr. et al.

[11] 4,313,860

[45] Feb. 2, 1982

[54] NON-PHOTOCHEMICALLY REACTIVE ANTIFOULING PAINT

[75] Inventors: Jesse R. Neal, Jr., Concord; Henry R. Bleile, Vallejo, both of Calif.

[73] Assignee: The United States of America as represented by the Secretary of the Navy, Washington, D.C.

[21] Appl. No.: 144,082

[22] Filed: Apr. 28, 1980

[51] Int. Cl.$^3$ .................... C08L 93/04; C09D 5/16
[52] U.S. Cl. .................... 260/27 R; 260/30.6 R; 260/31.8 G; 260/32.2; 260/42.52
[58] Field of Search ...................... 260/27 R

[56] References Cited

U.S. PATENT DOCUMENTS 2,525,155  10/1950  Thynne et al. .................. 260/27 R
3,211,680  10/1965  Updegraff et al. ............... 260/27 R
3,274,137   9/1966  Saroyan et al. ................. 260/27 R
3,794,501   2/1974  De Nio .......................... 260/27 R
3,898,190   8/1975  Willey .......................... 260/27 R

*Primary Examiner*—H. S. Cockeram
*Attorney, Agent, or Firm*—Charles D. B. Curry; R. S. Sciascia; George L. Craig

[57] ABSTRACT

A non-photochemically reactive vinyl type antifouling coating. The particular solvents and their particular formulations are selected to reduce photochemical reactions, principally ozone reduction, and to thereby reduce air pollution. The solvent formulations of the vinyl type antifouling coating are also selected to have higher flash-points and to thereby have greatly reduced hazard in application. The coating formulations are selected for painting and preserving the underwater portions of structures in the marine environment. Typical solvents are 2-ethoxyethanol, n-butyl alcohol and n-butyl acetate. Also included are rosin, tricresyl phosphate, pigments and anti-settling agents.

2 Claims, No Drawings

NON-PHOTOCHEMICALLY REACTIVE ANTIFOULING PAINT

BACKGROUND OF THE INVENTION

1. Field of the Invention.

The present invention relates to a non-photochemically reactive vinyl type antifouling paint. More particularly, it relates to a low solvent formulation vinyl type antifouling paint having excellent characteristics for protecting surfaces submerged in a marine environment. Specifically the instant invention relates to a formulation vinyl type antifouling paint having a high flash point for greater safety and yielding elimination of photochemically reactive volatile organic compunds.

2. Description of Prior Art

Fouling of surfaces exposed to the marine environment is a constant problem. Of particular concern to operators of naval vessels is the fouling of the vessel hulls. Since frictional resistance between the hull and the water is affected by the surface texture of the hull, it is directly influenced by hull fouling. A naval vessel having a fouled hull suffers a loss in speed and power as the fouling increases with a corresponding increase in fuel consumption to overcome the increased frictional resistance. Additional weight and volume displacement caused by a fouled hull requires additional power, and thus fuel consumption, over and above that due to hull fouling alone. Because of these problems, many types of marine antifouling coatings have been developed for application to boats, ships and marine facilities and equipment associated with them. Typical of the many antifouling coatings are hot plastic and vinyl resin coatings. The instant invention concerns the vinyl resin type coating. A problem occurring in the use of these antifouling coatings is the emission of volatile organic compounds. The application of marine coatings containing solvents and the associated use of solvents for thinning and clean-up generate emissions of volatile organic compounds that act as precursors to photochemical oxidants. Such emissions generate enormous amounts of pollutants daily measured in the tens of tons. Control of such emissions is essential to effective air pollution control. Because marine antifouling coatings are air dried and applied to large surfaces, it is not practical to duct the resultant emissions through control devices such as afterburners or carbon adsorbers. The instant invention provides a highly effective marine antifouling coating having all the advantages of conventional marine antifouling coatings without the photochemically reactive volatile organic compound emission problems and without the hazards of conventional low flashpoint coatings.

SUMMARY OF THE INVENTION

Briefly, the present invention comprises a non-photochemically reactive vinyl type antifouling coating. The particular solvents and their particular formulations are selected to reduce photochemical reactions, principally ozone production, and to thereby reduce air pollution. The solvent formulations of the vinyl type antifouling coating are selected to have higher flashpoints than found in conventional coatings and to thereby have greatly reduced hazard in application.

A primary object of invention is to obtain a highly effective low pollution marine antifouling coating.

Another object of invention is to provide a vinyl type marine antifouling coating having low content of photochemically reactive solvents and having greatly reduced emission of such organic compounds.

Yet another object of invention is to provide a highly effective vinyl type marine antifouling coating that is non-photochemically reactive and that has a high flash point.

DESCRIPTION OF THE PREFERRED EMBODIMENT

The basic marine antifouling coating of the instant invention is essentially a mixture of a vinyl resin composition, a pigment composition and a solvent composition together with an antisettling agent sufficient to prevent hard pigment settling and to provide acceptable storage requirements.

The vinyl resin composition of the instant invention is a vinyl chloride-vinyl acetate copolymer containing approximately 85 to 88 percent vinyl chloride and approximately 12 to 15 percent vinyl acetate. The vinyl resin composition has a specific gravity of approximately 1.35 to 1.37.

The instant invention provides a unique solvent composition in the vinyl type coating avoiding the high flashpoint and volatile organic compound emission problems associated with conventional vinyl type coatings.

The solvent in a marine coating has three primary functions: first, it provides composition fluidity for application; second, it provides a wetting agent for the surface to be coated and third, it provides in combination with water a eutectic mixture which is removed by evaporation. The solvent is also the primary source of the major problems associated with marine coatings: first, as a diluent, solvents frequently contain carcinogens injurious to human health; second, as the primary volatile compound source, the solvent is the primary determinant of the flash point of the coating and particular care must be exercised to provide a non-hazardous coating and third, during the evaporative process, the solvent is the primary source of the emission of volatile organic compounds generating air pollutants.

The solvent composition of the vinyl type antifouling coating of the instant invention conforms to the following requirements: (a) solvents containing olefinic or cycloolefinic type of unsaturation shall not exceed five percent by volume; (b) combinations of aromatic compounds containing more than eight carbon atoms to the molecule, excluding ethylbenzene, shall not exceed eight percent by volume; (c) combinations of ethylbenzene, toluene, trichloroethane or ketones containing branched structures shall not exceed twenty percent by volume; (d) the sum of (a), (b) and (c) shall not exceed twenty percent by volume of the solvent composition of the instant invention. In addition, the vinyl type antifouling coating formulated according to the solvent composition supra and according to the examples given below shall be suitable for spray application above 40° F. (4° C.) and shall have the flash points cited in the examples.

In Example 1, the vinyl type antifouling coating if formulated according to the resin/solvent requirements given above and the pigment requirements desired resulting in a red coating. Additional quantitative requirements of the formulation given in Example 1 are found in Table 1.

EXAMPLE 1

| Ingredients | Pounds |
| --- | --- |
| Cuprous oxide | 1440 |
| Rosin | 215 |
| Vinyl resin | 55 |
| Tricresyl phosphate | 50 |
| 2-Ethoxyethanol acetate | 14 |
| n-Butyl alcohol | 56 |
| n-Butyl acetate | 210 |
| anti-settling agent | 5 to 9 |

TABLE 1

| | Min. | Max. |
| --- | --- | --- |
| Pigment, percent by weight of paint | 70.0 | 72.0 |
| Volatiles, percent by weight of paint | 12.0 | 14.0 |
| Non-volatile vehicle, percent by weight of paint | 15.0 | 17.0 |
| Water, percent by weight of paint | | 0.5 |
| Total copper in pigment, percent by weight of pigment | 86.0 | — |
| Tricresyl phosphate, percent by weight of nonvolatile vehicle | 14.2 | — |
| Flashpoint | 85° F. | |

In Example 2 the non-photochemically reactive vinyl type antifouling coating is formulated according to the resin/solvent requirements given above and listed in the example below resulting in a black coating. Additional quantitative requirements of the formulation of Example 2 are given in Table 2.

EXAMPLE 2

| Ingredients | Pounds |
| --- | --- |
| Cuprous oxide | 1200 |
| Black iron oxide | 250 |
| Rosin | 215 |
| Vinyl resin | 55 |
| Tricresyl phosphate | 50 |
| 2-Ethoxyethanol acetate | 14 |
| n-Butyl alcohol | 56 |
| n-Butyl acetate | 210 |
| Anti-Settling agent | 5–10 |

TABLE 2

| | Min. | Max. |
| --- | --- | --- |
| Pigment, percent by weight of paint | 70.5 | 72.5 |
| Volatiles, percent by weight of paint | — | 15 |
| Non-volatile vehicle, percent by weight of paint | 13 | 15 |
| Water, percent by weight of paint | — | 0.5 |
| Total copper in pigment, percent by weight of pigment | 68.5 | — |
| Tricresyl phosphate, percent by weight of nonvolatile vehicle | 12.7 | — |
| Flashpoint | 85 | — |

What is claimed is:

1. A marine vinyl-type antifouling coating comprising:
   (a) a vinyl chloride-vinyl acetate copolymer component containing approximately 85 to 88 percent vinyl chloride, approximately 12 to 15 percent vinyl acetate and constituting about 55 parts by weight of said coating:
   (b) rosin constituting about 215 parts by weight of said coating;
   (c) a cuprous oxide pigment component constituting about 1440 parts by weight of said coating;
   (d) a tricresyl phosphate component constituting about 50 parts by weight of said coating;
   (e) an antisettling component constituting about 7 parts by weight of said coating; and
   (f) a solvent component constituting less than fifteen percent by weight of said coating and having subcomponents constituting about 14 parts by weight 2-ethoxyethanol, about 56 parts by weight n-butyl alcohol and about 210 parts by weight n-butyl acetate of said coating.

2. A marine vinyl-type antifouling coating comprising:
   (a) a vinyl chloride-vinyl acetate copolymer component containing approximately 85 to 88 percent vinyl chloride, approximately 12 to 15 percent vinyl acetate and constituting about 55 parts by weight of said coating;
   (b) rosin constituting about 215 parts by weight of said coating;
   (c) a cuprous oxide pigment component constituting about 1200 parts by weight of said coating;
   (d) a black iron oxide pigment component constituting about 250 parts by weight of said coating;
   (e) a tricresyl phosphate component constituting about 50 parts by weight of said coating;
   (f) an antisettling agent constituting about 8 parts by weight of said coating; and
   (g) a solvent component constituting less than fifteen percent by weight of said coating and having subcomponents constituting about 14 parts by weight 2-ethoxyethanol, about 56 parts by weight n-butyl alcohol and about 210 parts by weight n-butyl acetate of said coating.

* * * * *